J. T. Whitaker,
Harvester Rake.
No. 14,784.  Patented April 29, 1856.
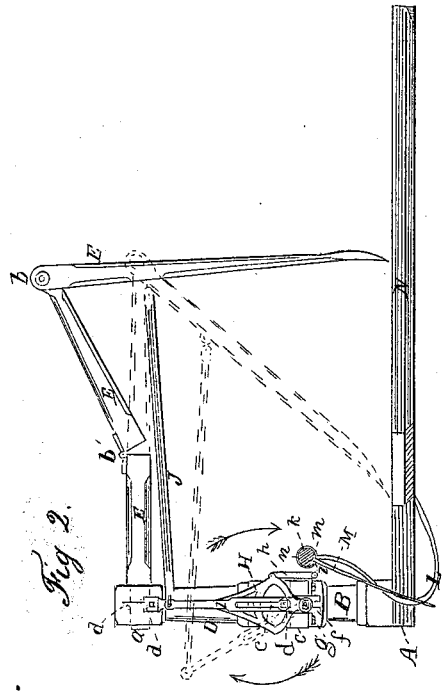
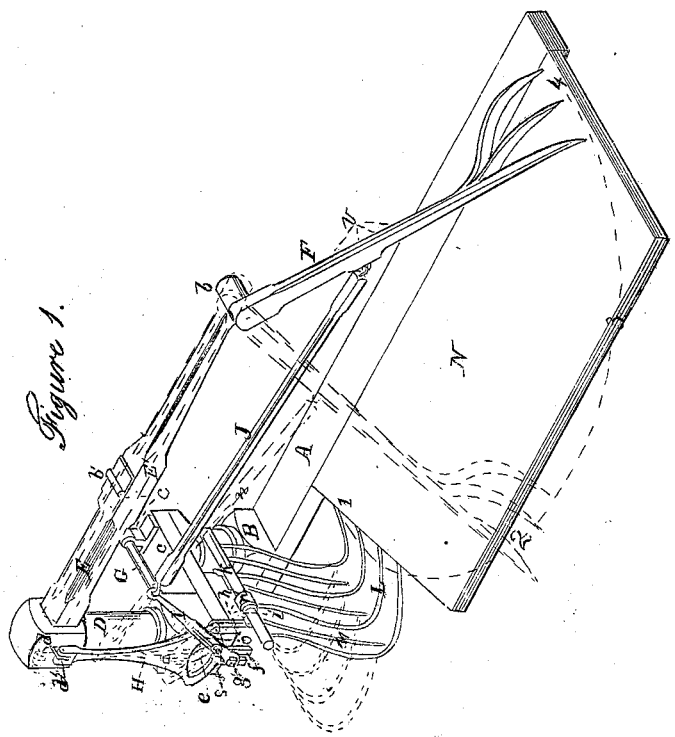

UNITED STATES PATENT OFFICE.

JOHN T. WHITAKER, OF ST. CHARLES, ILLINOIS.

IMPROVEMENT IN SELF-RAKERS FOR HARVESTERS.

Specification forming part of Letters Patent No. 14,784, dated April 29, 1856.

*To all whom it may concern:*

Be it known that I, JOHN T. WHITAKER, of St. Charles, in the county of Kane and State of Illinois, have invented certain new and useful Improvements in Self-Rakers for Reaping-Machines, of which the following is a full, clear, and exact description, reference being had to the accompanying drawings of the same, in which—

Figure 1 represents a view in perspective of the platform and cutter-bar of a machine having my improved apparatus applied thereto, the rake being extended and in position to sweep the grain off the platform upon the cradle, and showing in dotted lines the position of the former when midway on its return to the point from whence it started and that of the latter in discharging the grain upon the ground. Fig. 2 represents a side elevation of the same parts, showing the position of the rake midway in its advance to sweep off the grain, and representing in dotted lines its position immediately after discharging the grain from the platform upon the cradle.

The object of my invention is to provide an automatic rake that will rake the grain off the platform and deposit it in the rear of the driving-wheel or in the track of the horses in a neat and compact bundle by a simple and direct motion in a line parallel, or nearly so, with the sill or finger-bar. This I accomplish by so arranging my driving-wheel and gear that the space usually occupied by them in this class of machines shall be open, whereby the grain can be deposited immediately at the side of the platform upon the ground and in the rear of the horses, thus saving the complicated motions given to automatic rakers to make them rotate to deposit it in the rear, and also obviating the necessity of using the lifting and compressing arms and complex mechanism for rotating and operating the same requisite in others for the same purpose.

My improvements consist in causing a rake of peculiar construction to travel across the platform or receiving-apron from the side next the standing grain toward the side on which the driving-gear is situated, so as to gather such grain as may be collected upon the platform and deposit it at the side of the machine and in the track of the horses. At this point the rock-shaft to which the rake is attached is made slightly to rotate on its axis, thereby raising the rake off the rear of the platform, which then returns by a curved path to the point from whence it started in order to repeat the gathering process, the object of this motion being to prevent the rake from becoming entangled with the falling grain; but as the act of gathering and drawing the grain at the farther side of the platform toward the deposit side would push the grain next that side off as it advanced, the whole would be left straggling and uneven on the ground as the machine progresses, to prevent which I provide an apron or cradle to receive and collect the grain as it is thrown from the platform at each stroke of the rake, and then deposits it in a compact bundle upon the ground by suddenly slipping its fingers from under the grain, the latter being stripped by stationary teeth for that purpose, which prevent the grain from being carried with them in their backward motion. My machine in this instance represents the cradle as depositing the grain upon the ground at every stroke or vibration of the rake; but when working among thin grain the parts that give motion to the cradle may be so constructed as to operate it only at every alternate stroke. The whole apparatus is set in motion and operated by the machinery of the reaper.

To enable others skilled in the art to make and use my improvements, I will proceed to describe their construction and operation, omitting such parts of the general construction of a reaping-machine as are not essential to the full understanding of my invention.

On the end of the finger-bar A, and on the side next the driving-gear, is erected a standard, B, on the top of which is firmly secured a cap, C, projecting rearward, on the extremity of which is erected another standard, D, having a mortise through its upper extremity, which forms a bearing for the journal *a* of a jointed rock-shaft, E, to the end of which is connected the upper extremity of the rake F by means of a hinged joint, *b*, the lower end of the rake having a series of fingers or prongs by which the grain is gathered and swept off the platform, the rock-shaft being jointed at *b'* to permit its outer extremity, *e'*, to be raised as the rake is drawn toward the side of the machine to sweep the grain off the platform.

Through the lower end of the standard D, at right angles to the rock-shaft E, is a mortise, forming a bearing for one end of the horizontal shaft G, the other end being supported in bearings c, secured on the upper side of the cap C and over the standard B, there being secured on this end a pinion which communicates motion to the shaft from the driving-gear of the machine, and having on its other end a crank-cam, e, which works between the upper and lower concaves of the cam-yoke H, for a purpose to be hereinafter described.

On the rear side and at the upper end of the standard D is cut a slot, d, through which a pin or lever, d', is inserted into the journal a of the rock-shaft E. To the outer end of this lever is connected the upper extremity of the cam-yoke H by means of a hinge-joint. This yoke is of elliptic shape, having an upper and lower concave, each being formed by a radius equal in length to the distance from the center of the shaft G to the outer edge of the cam e, both concaves or arcs being subtended by chords of equal length; and I would here add that it is advisable not to make the shorter diameter of the ellipse greater than will permit of the free working of the cam, as in that case support will be given to the cam-yoke on the upper side of the shaft as the cam is traversing over the lower concave, the tendency of the yoke being to slide downward when the pressure of the cam is removed from the upper side, which would exert an injurious effect upon the other parts of the machinery.

On the under side of the lower concave are two guide-arms, f, which slide over a pin, g, secured to the lower end of the standard D, and which serve to direct the motion of the yoke-arm in a vertical direction as it is acted upon by the cam e.

On the side of the yoke H next the platform, and at the junction of the two concaves, is pivoted the connecting-rod h, to the lower end of which is hinged the cylinder i, which in turn is secured to the lever k, that carries the cradle-fingers L. The cylinder k is mounted on the shaft m, upon which it is free to turn, the latter being supported and rigidly secured at one end to a bracket, n, while the forward end of the cylinder rests in a bearing, n', both being secured to the under side of the cap C, the whole forming the cradle or apron for receiving the grain as it is raked off the platform.

Between the fingers, on the under side of the cylinder k, are cut a series of slots, through which rods or stripping-teeth M pass, and are secured to the shaft m. The object of these teeth is to strip the grain from off the fingers of the cradle as the latter is rapidly withdrawn in order to deposit it in a compact bundle upon the ground.

At the end and on the outer side of the cam e is secured a crank pin or handle, which passes through a longitudinal slot, o, in a crank-lever, I, where it is held loosely in place by means of a nut, s, the latter (the lever) being pivoted at its lower extremity to the pin g.

To the upper extremity of the lever I is hinged the end of the connecting-rod J, by means of an eyebolt and staple, the other being secured to the rake F in a similar manner, so as to form universal joints.

Through the rake F are or may be pierced a number of holes, v, to which the staple may be changed, as by increasing or diminishing the distance between the staple and the joint b the extent of motion of the rake may be varied to adapt it to platforms of different widths of cut.

The details of my apparatus having been given, I will now proceed to give a description of its operation.

The rake F being placed in position to gather the grain, as in Fig. 1, and motion communicated to the shaft from the driving-gear of the machine, so that the crank-cam e will revolve in the direction of the arrows, it will cause the crank-pin that works in the slot o to push the crank-lever I outward, carrying with it the connecting-rod J and rake F, until the cam has traversed the whole length of the lower concave and begins to act upon the upper, at which point the rake F will have traveled over the entire length of the platform and deposited the grain in a bundle upon the cradle L, the latter having been in position to receive it from the time the rake began to gather it. The rake F having been made to assume the position shown in Fig. 2, raising the hinged end E' of the rock-shaft E as it advanced until it reached this point, when the end will gradually return to its horizontal position as the rake draws near the end of its forward stroke, at which time it will have attained that position, both being in the position represented in dotted lines, Fig. 2, the hinge-joint b' in this instance serving a twofold purpose: first, as it permits the rake, which necessarily must be longer than the post, to assume a vertical position as it rakes off the grain, and, second, because the weight of the arm thus raised causes the points of the prongs of the rake to bear upon the platform, in this way preventing it from overriding the grain. The cam now begins to press upon the upper concave of the cam-yoke H until it has passed the first half, raising it, which presses the lever or pin d' upward, causing the shaft E to rotate upon its axis, throwing the rake around and clear of the platform in an oblique position as shown in dotted lines, Fig. 1, and describing a curved path, as shown in the dotted line 1 2 3 4. As the cam-yoke is raised it drags up the connecting-rod h, which causes the cradle L to rotate backward on its axis, dragging its fingers from beneath the grain, which is stripped off them by the stationary teeth M for that purpose, the cradle then occupying the position shown in dotted lines, Fig. 1. Simultaneously with this movement of the cam-yoke does the crank-pin e' press the lever I inward toward the platform N, causing the rake F, in conjunction with the rotary motion of the rock-shaft E, to recede over the dotted line 1 2 3 4, Fig. 1, until the cam e again begins to press against the lower concave, when the cam-yoke is again depressed, causing the rock-shaft E to turn until the rake is brought into the same position from whence it started, the cradle also having resumed its position to receive the grain from the rake by the depression of the yoke, this whole operation being repeated for every revolution of the cam-shaft G. The height of the standard should be raised high enough to permit the rake, when extended at either end, to describe a tolerably obtuse angle, although always less than a right angle—say from forty-five degrees to seventy degrees—as if made less the tendency of the rake at the commencement of its stroke would be to press the grain down upon the platform and override instead of gathering it, and at the end of the stroke to pass underneath it and drag it back instead of depositing it upon the fingers of the cradle; and it would also be well to remark that the length of the rock-shaft should in no case extend farther than the middle of the platform, as it would materially affect the efficiency of the rake in gathering and delivering the grain.

One great advantage of my improvements over others arises from the fact of its delivering the grain at the side of the machine and in the track of the horses by one simple and direct movement of the rake, thus enabling me to lay aside difficult and complicated motions which render machines of this class so liable to get out of order. Another is the fact of the rake being made adjustable, so as to suit a wide or narrow cut, as may be deemed advisable, and, thirdly, in the cradle remaining stationary during the operation of gathering the grain into it from the platform, so as to deposit it in one compact bundle for each operation of the rake by means of stripping-teeth for that purpose.

Having thus described my invention, what I claim as new, and desire to secure by Letters Patent, is—

1. The rock-shaft E, in combination with the rake F and connecting-shaft J, operating in the manner and for the purposes substantially as herein set forth.

2. In combination with the rake F, the cradle L, when operating in the manner and for the purposes set forth.

3. The method of adjusting the rake F so as to enable it to rake from platforms of different widths of cut, substantially as described.

In testimony whereof I hereunto subscribe my name.

JOHN T. WHITAKER.

Witnesses:
   EDWD. A. DICKINS,
   P. HANNAY.